United States Patent [19]

Oughton

[11] 4,390,469
[45] Jun. 28, 1983

[54] CONTROL OF RESIDUAL SOLVENT IN OAT PRODUCTS

[75] Inventor: Richard W. Oughton, Kingston, Canada

[73] Assignee: Du Pont Canada Inc., Mississauga, Canada

[21] Appl. No.: 258,384

[22] Filed: Apr. 28, 1981

[30] Foreign Application Priority Data

May 15, 1980 [CA] Canada .................................. 352012

[51] Int. Cl.$^3$ ............................................. A23J 1/12
[52] U.S. Cl. ................................ 260/123.5; 426/430; 426/656
[58] Field of Search ...................... 260/123.5, 112 R; 426/430, 656

[56] References Cited

U.S. PATENT DOCUMENTS

| | | | |
|---|---|---|---|
| 3,966,981 | 6/1976 | Schultz | 426/425 |
| 4,053,492 | 10/1977 | Boocock | 260/412.4 |
| 4,072,669 | 2/1978 | Betschart | 260/123.5 |
| 4,089,848 | 5/1978 | Bell | 426/656 |
| 4,208,259 | 6/1980 | Oughton | 426/436 |
| 4,211,695 | 7/1980 | Oughton | 260/123.5 |
| 4,211,801 | 7/1980 | Oughton | 426/430 |

FOREIGN PATENT DOCUMENTS 1052170 4/1979 Canada .

*Primary Examiner*—Allan Lieberman
*Assistant Examiner*—Patricia Short

[57] ABSTRACT

An improvement in a process for the treatment of proteinaceous material, wherein the proteinaceous material is admixed with a hydrocarbon solvent for any oil in the proteinaceous material and at least a fraction of the proteinaceous material is separated from the solvent and treated for removal of residual solvent, is disclosed. The improvement is characterized by (a) maintaining the temperature of the admixture of proteinaceous material and solvent in the range 0°–35° C., and (b) controlling the period of the time of contact of solvent and proteinaceous material and the period of the time of treatment for removal of residual solvent, whereby separation of a product having a level of residual solvent of less than 60 ppm may be effected. The proteinaceous material may be comminuted oats or matter derived therefrom. Products having low residual solvent may be obtained. Such products may be used in the food industry.

11 Claims, No Drawings

CONTROL OF RESIDUAL SOLVENT IN OAT PRODUCTS

BACKGROUND OF THE INVENTION

1. Field of the Invention

The present invention relates to the control of the amount of residual solvent in oat products and in particular to the control of the amount of residual solvent in comminuted oats that have been admixed with hydrocarbon solvent in a process for the separation of oil therefrom and/or in a process for the separation of fractions differing in protein content.

As used herein, the expression "groats" refers to the kernel of the oat, the expression "flour" refers to the endosperm of the oat, and the expression "bran" refers to the bran of the oat; such bran may have endosperm attached thereto. The expression "gum" refers in particular to water-soluble gum.

Oats are a potential source of a wide variety of useful products. Examples of such products are flour, starch, protein isolate and concentrate, proteinenriched flour, bran, gum and oil. Traditional techniques used in the cereal grain processing industry are frequently difficult to use with oats. For example, milling processes are difficult to use with oats because of process problems relating to the presence of oil in oats. Moreover, unless the oats are de-oiled prior to milling, such milling processes would result in the formation of flour and bran fractions containing oil which may result in the development of rancidity on the storage of the flour and bran.

2. Description of the Prior Art

Processes for the separation of comminuted oats into fractions, especially proteinaceous fractions, in which the comminuted oats or fractions thereof are admixed with hydrocarbon solvents for separation of the oil in the oats are known. Such processes are disclosed by R. W. Oughton in U.S. Pat. No. 4,208,259, issued June 17, 1980; U.S. Pat. Nos. 4,211,695 and 4,211,801, both issued July 8, 1980.

The use of hydrocarbon solvents, especially hexane, in order to de-oil proteinaceous materials containing oil, e.g., soya beans and cottonseed, is known. Moreover, in some countries the amount of residual solvent in the de-oiled material after separation from the oil bearing miscella, is subject to government regulation. For instance, under U.S. Food and Drug Administration Regulation No. 172,894, the amount of residual hexane in cottonseed meal for human use must be less than 60 ppm.

Several methods are known for reducing the amount of residual solvent in products that have been in contact with hydrocarbon solvents. For example, de-oiled soya beans have been treated with vacuum or steam or have been heated in ovens to promote evaporation of residual solvent. However, it has been found that even with intensive application of such methods, it is difficult to obtain products containing less than 60 ppm of residual solvent. Moreover, prolonged heating of proteinaceous products tends to result in denaturing of the protein.

A process for reducing the amount of residual solvent in soya beans is disclosed by W. G. Schultz in U.S. Pat. No. 3,966,981, which issued June 29, 1976. In that process, soya beans that contain residual hexane as a result of a de-oiling step are extracted with liquid carbon dioxide under conditions whereby the carbon dioxide remains in a liquid state. A process for the removal of residual solvent from proteinaceous materials, especially isopropanol from fish protein, by treating with air having a temperature of 40°–90° C. and at least 50% relative humidity, is disclosed in Canadian Patent 1,052,170 of T. Knutsen et al., which issued Apr. 10, 1979.

In spite of the methods known in the art, there is a need for an improved process for controlling the amount of residual solvent at a level of less than 60 ppm in products that have been in contact with hydrocarbon solvents.

BRIEF SUMMARY OF THE INVENTION

Surprisingly, it has now been found that the level of residual solvent may readily be controlled at levels of less than 60 ppm by contacting the oats with hydrocarbon solvent at a temperature of less than 35° C., especially 0°–35° C., and controlling the time of contact of solvent and oats and the time of treatment for removal of residual solvent from the de-oiled product.

Accordingly, the present invention provides an improvement in the process for the control of the amount of residual solvent in proteinaceous material selected from the group consisting of comminuted oats, and matter derived therefrom, wherein the proteinaceous material is admixed with a hydrocarbon solvent for oat oil and at least a fraction of the proteinaceous material is separated from the solvent and treated for removal of residual solvent, in which the improvement comprises:

(a) maintaining the temperature of the admixture of proteinaceous material and solvent in the range 0°–35° C., and (b) controlling the period of the time of contact of solvent and proteinaceous materials and the period of the time of treatment for removal of residual solvent, whereby separation of a product having a level of residual solvent of less than 60 ppm may be effected.

In a preferred process of the present invention, the treatment for removal of residual solvent involves the use of vacuum.

In another preferred embodiment, the treatment for removal of residual solvent involves the use of steam.

DETAILED DESCRIPTION

In the process of the present invention, comminuted oats are admixed with a hydrocarbon solvent for the oil in the oats. Such a solvent will facilitate extraction of oat oil from the comminuted oat fraction, i.e., the de-oiling of the fraction. The solvent used must be acceptable for use with foodstuffs, e.g., be nontoxic at the levels remaining in the products subsequently produced, not cause the formation of toxic materials in the products and not have a significant deleterious effect on the nutritional value of the product. The amount and type of solvent remaining in products offered for sale must be acceptable to the appropriate health authorities, as will be understood by those skilled in the art. Examples of solvents are pentane, hexane, heptane and cyclohexane, and mixtures thereof; as used herein the solvents hexane and heptane include those solvents referred to in the food industry as hexane and heptane. The preferred solvent is hexane. The present invention will generally be described hereinafter with reference to hexane as the solvent.

The comminuted oats used in the process of the present invention are preferably comminuted dehulled oats, or fractions derived therefrom. Techniques for dehulling oats are known in the art. The dehulled oats, herein frequently referred to as groats, are comminuted in order to facilitate extraction of oil and to facilitate separation of the comminuted groats so obtained into fractions differing in composition, as is described in the aforementioned U.S. Patents of R. W. Oughton. Conventional comminuting techniques, for example, pin-milling, hammer-milling and other shearing techniques, would appear to produce acceptable comminuted groats.

In the process of the present invention comminuted groats is admixed with a solvent for separation of oil in the oats. Usually the admixing will be such that a slurry of comminuted groats in solvent, e.g., hexane, is formed. Such admixing may include one or more steps to affect separation of the comminuted groats into fractions differing in composition, especially with regard to the protein content of such fractions. Examples of such steps are given in the aforementioned U.S. Patents of R. W. Oughton.

After a period of time, the comminuted groats, or fractions thereof, is separated from the hexane solvent. The comminuted groats, or fractions thereof, will normally be substantially de-oiled. The products thus obtained are then subjected to techniques for the removal of residual solvent, i.e., that solvent remaining associated with the products obtained after separation of the products from the solvent miscella. Such techniques may include subjecting the products to the influence of vacuum, steam and/or heat for a period of time. The removal of residual solvent should be carried out under conditions that do not cause significant de-naturing of any protein in the products.

Surprisingly, it has been found that the process may readily be controlled so as to provide products having residual levels of solvent, after treatment for removal of residual solvent, of less than 60 ppm and in preferred embodiments less than 30 ppm.

In the first instance, the temperature of the solvent with which the comminuted oats are admixed is controlled at a temperature in the range 0°-35° C. As is exemplified hereinafter, even increasing the temperature of the solvent to about 50° C. results in substantial increases in residual solvent in the products and such increased amounts cannot readily be reduced to less than 60 ppm, let alone less than 30 ppm, by simple techniques.

In addition to controlling the temperature of the solvent, the total time during which the comminuted oats are in contact with the solvent, i.e., in the form of the admixture, is also controlled. Preferably, such time is the minimum practical time needed to accomplish de-oiling of the comminuted oats and to accomplish any separation of the oats into fractions. Preferably, the total period of time is less than 120 minutes, and in particular, less than 80 minutes, although longer times may be used, as is exemplified hereinafter.

The period of time required to reduce the level of residual solvent in factions separated from the solvent to less than 60 ppm using a particular method for reducing residual solvent will depend, in particular, on the temperature of the solvent and the time of contact of solvent and oats. The period of time required to reduce the level of residual solvent will normally be in the range 5 to 500 minutes, usually 5 to 100 minutes. An important characteristic of the present invention is that it is possible by normal techniques to reduce the amount of residual solvent to less than 60 ppm in reasonable times. As is exemplified hereinafter, if higher solvent temperatures are used, i.e., higher than 35° C., even treatment for 1400-3000 minutes may not and usually does not result in residual solvent levels of less than 60 ppm. At temperatures of, e.g., 50° C. and higher, the levels of residual solvent obtained are substantially greater than 60 ppm and moreover may show little tendency of decreasing to below 60 ppm.

The period of time required to reduce the level of residual solvent according to the process of the present invention to less than 60 ppm may depend on the nature of the fraction of proteinaceous material separated from the solvent, especially on the protein content of that fraction. As is exemplified hereinafter, the level of residual solvent may be more readily reduced in fractions having a relatively low protein content than in fractions having a relatively high protein content. Although the process of the present invention may be used on fractions of proteinaceous material having a low or high protein content, in a preferred embodiment the fraction has a protein content in excess of 50%.

The maximum period of time during which the comminuted oats may be in contact with solvent while still providing products having a residual solvent of less than 60 ppm, is related to the temperature of the solvent and the method used in the treatment of the product for the removal of residual solvent. At higher temperatures within the range 0°-35° C., shorter contact times of solvent and oats should be used. Moreover, some methods of treatment, e.g., the use of steam and/or pellets, are more effective in a given period of time for the removal of residual solvent. Thus, the particular treatment for removal of residual solvent may be an important factor in determining the maximum period of time of contact of solvent and oats. Examples of different treatment methods are given hereinafter.

In a preferred embodiment of the process of the invention, the fraction separated from the solvent is pelletized prior to being treated for removal of residual solvents.

In another preferred embodiment, the treatment for removal of residual solvent involves the use of steam.

The present invention is illustrated by the following examples.

EXAMPLE I

A 10 g sample of comminuted Hinoat groats that had been comminuted by passing three times through a roller mill, was admixed with 100 ml of hexane at a controlled extraction temperature. After a period of time, at the extraction temperature, the sample was poured onto a 200 mesh Tyler ® screen. The admixture passing through the screen was filtered under vacuum to separate the solid material. The collected solids were washed with 85 g of hexane at 20° C. The solids were then removed from the filter paper and subjected to a vacuum of 0.7 kPa in a vacuum oven for one hour at 80° C.

The solids thus obtained were analyzed for residual solvent. The technique used for analyzing for residual solvent in this example and those following was as follows:

Approximately 100-120 mg of the solids were weighed and placed in a glass tube which was then plugged with glass wool. The glass tube was placed in a Chromalytics ® 1047 concentrator attached to a Varian ® Series 2700 gas chromatograph. The concentrator was programmed to heat the sample for 10 minutes at 195° C. during which time any volatile material was collected on a PORAPAK ® Q column in the concentrator. Subsequently, the column was heated to 210° C. and the amount of volatile matter was analyzed using the gas chromatograph. The gas chromatograph was calibrated using solutions of hexane in methanol. The error in the measurements is believed to be about ±10%.

The results obtained were as follows:

| Extraction Time (minutes) | Extraction Temp. (C.) | Residual Solvent (ppm Hexane) |
|---|---|---|
| 0* | 20 | 0 |
| 4 | 20 | 1.0 |
| 8 | 20 | 1.7 |
| 16 | 20 | 2.6 |
| 32 | 20 | 4.2 |
| 64 | 20 | 12 |
| 128 | 20 | 16 |
| 256 | 20 | 23 |

*sample not contacted with hexane.

This example shows that at a constant extraction temperature of 20° C. the amount of residual solvent increases with increasing extraction time.

EXAMPLE II

The procedure of Example I was repeated using a constant extraction time and various extraction temperatures.

The results were as follows:

| Extraction Time (minutes) | Extraction Temp. (°C.) | Residual Solvent (ppm Hexane) |
|---|---|---|
| 64 | 0 | 7.9 |
| 64 | 10 | 3.7 |
| 64 | 20 | 7.4 |
| 64 | 30 | 22 |
| 64 | 36 | 53 |
| 64 | 40 | 75 |
| 64 | 50 | 166 |

This example shows the critical nature of the extraction temperature.

EXAMPLE III

The procedure of Examples I and II was repeated but with the solids being subjected to vacuum under differing conditions. The vacuum used was 0.4 kPa.

The results were as follows:

| Extraction Time (min.) | Extraction Temp. (°C.) | Vacuum (min.) | Vacuum Temp. (°C.) | Residual Solvent (ppm Hexane) |
|---|---|---|---|---|
| 64 | 20 | 60 | 22 | 23 |
| 64 | 20 | 60 | 80 | 16 |
| 64 | 20 | 330 | 22 | 20 |
| 64 | 20 | 330 | 80 | 14 |
| 64 | 20 | 1320 | 22 | 20 |
| 64 | 20 | 1320 | 80 | 10 |

This example shows that increasing the temperature at which the solids are subjected to vacuum has a small effect on the amount of residual solvent. Increasing the time under vacuum appears to have little effect at 22° C. and a larger effect at 80° C. on the amount of residual solvent.

EXAMPLE IV

Using the procedure of Examples I-III, the effect of extraction temperature and time under vacuum were further investigated. The extraction time was 16 minutes, the vacuum was 0.4 kPa and the temperature of the solids subjected to vacuum was 80° C.

The results were as follows:

| Extraction Temp. (°C.) | Vacuum Time (minutes) | Residual Solvent (ppm Hexane) |
|---|---|---|
| 40 | 15 | 27 |
| 40 | 30 | 23 |
| 40 | 60 | 20 |
| 40 | 1440 | 7.5 |
| 30 | 15 | 16 |
| 30 | 30 | 16 |
| 30 | 60 | 14 |
| 30 | 1440 | 9.7 |
| 20 | 15 | 4.8 |
| 20 | 30 | 4.4 |
| 20 | 60 | 4.9 |
| 20 | 1440 | 2.5 |
| 10 | 15 | 3.9 |
| 10 | 30 | 4.0 |
| 10 | 60 | 4.2 |
| 10 | 1440 | 3.4 |
| 0 | 15 | 4.2 |
| 0 | 30 | 4.2 |
| 0 | 60 | 3.4 |
| 0 | 1440 | 2.4 |

This example shows that a reduction in extraction temperature has more effect than increasing the time under vacuum.

EXAMPLE V

A sample of Hinoat endosperm admixed with hexane in the form of a slurry and at a temperature in accordance with this invention was passed through a 10 mm hydrocyclone. Samples of the underflow and overflow from the hydrocyclone were collected. Hexane was added to the collected samples to give a slurry of approximately 20%, by weight, solids. 5 ml samples of the resultant slurries were then taken. The hexane was evaporated from each sample which was then subjected to a vacuum of 0.4 kPa in an oven for one hour at 80° C. The product obtained was analyzed for protein content and residual solvent.

The results were as follows:

| Sample | Protein (%) | Residual Hexane (ppm) |
|---|---|---|
| underflow | 9.5 | 3.4 |
| overflow | 94.0 | 35 |

The result indicates that the protein content of the sample is a factor in the level of residual solvent obtained.

EXAMPLE VI

The treatment procedure of Example I was repeated using the sample of bran obtained, i.e., the material retained on the Tyler ® screen. The bran was dried over a hot water bath to remove excess hexane before being subjected to a vacuum of 1.1 kPa at a temperature of 80° C. for various periods of time.

The results were as follows:

| Extraction Time (min) | Extraction Temp. (°C.) | Residual Hexane (ppm) | | |
|---|---|---|---|---|
| | | 15 minutes vacuum | 60 minutes vacuum | 1440 minutes vacuum |
| 16 | 20 | 26 | 23 | 5.1 |
| 60 | 20 | 52 | 32 | 10 |
| 16 | 50 | 92 | 84 | 35* |
| 60 | 50 | 205 | 172 | 80* |

*time under vacuum was 2460 minutes.

EXAMPLE VII

Overflow and underflow samples from a multiple hydrocyclone separation process of a type described in the aforementioned U.S. Pat. No. 4,211,695 and which had not been treated for removal of residual hexane solvent, were admixed in varying proportions. The resultant samples were then heated in a hot water bath and dried at 80° C. for one hour at atmospheric pressure. The thus treated samples were analyzed for protein using a Kjel-Foss Automatic Protein Analyzer (N×6.25) and for residual hexane.

The period of time between when comminuted groats was first contacted with hexane and when admixed overflow/underflow samples were treated for removal of hexane was in excess of one week.

The results obtained were:

| Overflow (g) | Underflow (g) | Protein Content (%) | Residual Hexane (ppm) |
|---|---|---|---|
| 33.0 | 0 | 74.6 | 303 |
| 33.2 | 0.55 | 63.1 | 257 |
| 32.8 | 1.10 | 55.2 | 230 |
| 32.5 | 1.65 | 47.9 | 209 |
| 32.2 | 2.20 | 43.8 | 173 |
| 0 | 2.50* | 6.6 | 26 |

*admixed with 30 g of hexane

The results show the effect of protein content on residual solvent and the effect of the prolonged period during which the samples were in contact with hexane.

EXAMPLE VIII

Ten grams of comminuted Hinoat groats were admixed as a slurry, with 100 ml of cyclohexane. The slurry was sieved using a 200 mesh Tyler ® screen and the endosperm fraction which passed through the screen, was vacuum filtered. The endosperm fraction obtained was dried at 80° C. for one hour at atmospheric pressure. The endosperm, which contained 16.0% protein, was analyzed for residual cyclohexane.

The results of runs using different cyclohexane temperatures and contact times were as follows:

| Cyclohexane Temp. (°C.) | Contact Time (minutes) | Residual Cyclohexane (ppm) |
|---|---|---|
| 20 | 15 | 7.9 |
| 20 | 60 | 8.2 |
| 50 | 15 | 79 |
| 50 | 60 | 167 |

The results again show the effect of solvent temperature and contact time.

EXAMPLE IX

An oat protein concentrate containing about 10% by weight of hexane and which had been obtained from a process for the treatment of slurry of comminuted groats in hexane using a decanter centrifuge was pelletized using a hand-operated pellet press. During the pelletizing process the concentrate was subjected to a pressure of either 13.8 MPa or 69 MPa for a period of one minute. The pellets were then treated for eight minutes at various temperatures and in atmospheres of either air or steam for removal of residual solvent. As a comparison unpelletized protein concentrate was treated under the same conditions. After treatment, the pellets were crushed before being analyzed for hexane.

The period of time between the contacting of the groats with hexane and the treatment of the protein concentrate for removal of solvent was in excess of one week.

The results were as follows:

| Sample Type | Pelletizing Pressure* MPa | Atmosphere | Residual Hexane (ppm) |
|---|---|---|---|
| (a) Temperature 110° C. | | | |
| pellet | 13.8 | steam | 31 |
| pellet | 69 | steam | 25 |
| powder | — | steam | 109 |
| pellet | 13.8 | air | 254 |
| pellet | 69 | air | 172 |
| powder | — | air | 462 |
| (b) Temperature 130° C. | | | |
| pellet | 13.8 | steam | 21 |
| pellet | 69 | steam | 23 |
| powder | — | steam | 51 |
| pellet | 13.8 | air | 196 |
| pellet | 69 | air | 127 |
| powder | — | air | 326 |

*pellet size approximately 3.1 cm in diameter, 0.38–0.56 cm in thickness and 3.0–4.0 g in weight The pelletized samples show lower residual solvent than the powder samples. Atmospheres of steam were more effective than air in reducing residual solvent.

To test the effect of longer treatment times, pellets made at a pressure of 13.8 MPa and powder were treated for the removal of residual hexane for one hour at 110° C. in an atmosphere of steam. The pellet had a residual hexane level of 18 ppm and the powder had a residual level of 68 ppm, thereby showing that extended treatment times do further reduce the level of residual solvent but that even after one hour the powder still had a higher residual solvent than the pellet did after eight minutes.

I claim:

1. An improvement in the process for control of the amount of residual solvent in proteinaceous material selected from the group consisting of comminuted oats and matter derived therefrom, wherein the proteinaceous material is admixed with a hydrocarbon solvent selected from the group consisting of pentane, hexane, heptane and cyclohexane, and mixtures thereof, and at least a fraction of the proteinaceous material is separated from the solvent and treated for removal of residual solvent, the improvement comprising:

(a) maintaining the temperature of the mixture of proteinaceous material and solvent in the range of 0°–35° C.; and (b) controlling the period of time of contact of solvent and proteinaceous material to less than 120 minutes, and the period of time of treatment for removal of residual solvent to a range of 5 to 500 minutes, whereby separation of a product having a level of residual solvent of less than 60 ppm may be effected.

2. The process of claim 1 in which the period of the time of treatment for removal of residual solvent is in the range of 5 to 100 minutes.

3. The process of claim 1 in which the product has a level of residual solvent of less than 30 ppm.

4. The process of, claim 1 or claim 2 in which, in the treatment for removal of residual solvent, the fraction of proteinaceous material is contacted with steam.

5. The process of, claim 1 or claim 2 in which, in the treatment for removal of residual solvent, the fraction of proteinaceous material is subjected to a vacuum.

6. The process of, claim 1 or claim 2 in which the fraction of proteinaceous material has a protein content of greater than 50%.

7. The process of, claim 1 or claim 2 in which the proteinaceous material is comminuted oats.

8. The process of, claim 1 or claim 2 in which the proteinaceous material is a bran fraction derived from comminuted oats.

9. The process of, claim 1 or claim 2 in which the proteinaceous material is a protein fraction derived from comminuted oats.

10. The process of, claim 1 or claim 2 in which the solvent is hexane.

11. The process of, claim 1 or claim 2 in which the treatment for removal of residual solvent is carried out on a fraction of proteinaceous material that is in the form of pellets.

* * * * *